United States Patent
Abuto et al.

[11] Patent Number: 5,804,021
[45] Date of Patent: Sep. 8, 1998

[54] SLIT ELASTIC FIBROUS NONWOVEN LAMINATES AND PROCESS FOR FORMING

[75] Inventors: Frank Paul Abuto, Alpharetta; Andrew Edward Diamond, Roswell; Ruth Lisa Levy, Sugar Hill; Stephen Clark Smith, Altanta, all of Ga.

[73] Assignee: Kimberly-Clark Worldwide, Inc., Neenah, Wis.

[21] Appl. No.: 644,462

[22] Filed: May 10, 1996

Related U.S. Application Data

[63] Continuation of Ser. No. 236,785, Apr. 29, 1994, abandoned.

[51] Int. Cl.$^6$ .................. B32B 31/12; B32B 5/04; B32B 27/12

[52] U.S. Cl. .................. 156/252; 156/229; 156/256; 156/263; 428/138; 428/152; 442/381; 442/394

[58] Field of Search ................ 156/229, 252, 156/259, 263, 163, 164, 308.4, 290, 256; 604/358, 365, 366, 384, 385.1, 385.2; 428/152, 138; 442/381, 394

[56] References Cited

U.S. PATENT DOCUMENTS

| | | |
|---|---|---|
| 2,800,423 | 7/1957 | Swart .......................... 154/43 |
| 3,276,944 | 10/1966 | Levy .......................... 161/150 |
| 3,338,992 | 8/1967 | Kinney ....................... 264/24 |
| 3,341,394 | 9/1967 | Kinney ....................... 161/72 |
| 3,423,266 | 1/1969 | Davies et al. .............. 156/167 |
| 3,502,538 | 3/1970 | Petersen ..................... 161/150 |
| 3,502,763 | 3/1970 | Hartmann .................. 264/210 |
| 3,542,615 | 11/1970 | Dobo et al. ................. 156/181 |
| 3,654,060 | 4/1972 | Goldman .................... 161/112 |
| 3,692,618 | 9/1972 | Dorschner et al. ......... 161/72 |
| 3,802,817 | 4/1974 | Matsuki et al. ............. 425/66 |
| 4,036,233 | 7/1977 | Kozak . |
| 4,055,180 | 10/1977 | Karami ...................... 128/287 |
| 4,100,324 | 7/1978 | Anderson et al. .......... 428/288 |
| 4,209,563 | 6/1980 | Sisson ........................ 428/288 |
| 4,327,728 | 5/1982 | Elias .......................... 128/285 |
| 4,340,563 | 7/1982 | Appel et al. ................ 264/518 |
| 4,360,021 | 11/1982 | Stima ......................... 128/287 |
| 4,381,783 | 5/1983 | Elias .......................... 604/368 |
| 4,450,026 | 5/1984 | Pieniak et al. .............. 156/164 |
| 4,525,407 | 6/1985 | Ness .......................... 428/138 |
| 4,606,964 | 8/1986 | Wideman ................... 429/152 |
| 4,663,220 | 5/1987 | Wisneski et al. ........... 428/221 |
| 4,692,368 | 9/1987 | Taylor et al. ............... 428/137 |
| 4,707,398 | 11/1987 | Boggs ........................ 428/224 |
| 4,720,415 | 1/1988 | Wielen et al. .............. 428/152 |
| 4,731,066 | 3/1988 | Korpman . |
| 4,741,949 | 5/1988 | Morman et al. ............ 428/224 |
| 4,787,699 | 11/1988 | Moulin ....................... 350/96.21 |
| 4,803,117 | 2/1989 | Daponte ..................... 428/228 |
| 4,879,170 | 11/1989 | Radwanski et al. ........ 428/233 |
| 4,883,549 | 11/1989 | Frost et al. ................. 156/161 |

(List continued on next page.)

FOREIGN PATENT DOCUMENTS

| | | | |
|---|---|---|---|
| 0138225 | 4/1985 | European Pat. Off. | ......... D04H 1/00 |
| 0217032 | 4/1987 | European Pat. Off. | ....... D04H 13/00 |
| 0312071A2 | 4/1989 | European Pat. Off. . | |
| 2017485 | 10/1979 | United Kingdom | ............ A47L 17/08 |

OTHER PUBLICATIONS

Search Report, Application number PCT/US 95/04931, 24 Aug. 1995.

*Primary Examiner*—Curtis Mayes
*Attorney, Agent, or Firm*—Nicholas N. Leach; James B. Robinson

[57] ABSTRACT

The present invention is directed to elastic fibrous nonwoven web laminates which exhibit elastic properties in at least one direction and, if desired, two or more directions due to the use of at least one fibrous nonwoven web facing layer which contains a plurality of slits. The resultant laminates are useful in a wide variety of applications not the least of which include garments, surgical drapes and other supplies as well as personal care absorbent articles including diapers, training pants, sanitary napkins, incontinence garments, bandages and the like. Processes for forming such laminates are also disclosed.

20 Claims, 7 Drawing Sheets

U.S. PATENT DOCUMENTS

| | | | |
|---|---|---|---|
| 4,895,568 | 1/1990 | Enloe . | |
| 4,939,016 | 7/1990 | Radwanski et al. | 428/152 |
| 4,941,933 | 7/1990 | Korpman | 156/160 |
| 4,960,477 | 10/1990 | Mesek | 156/209 |
| 4,981,747 | 1/1991 | Morman | 428/198 |
| 4,988,345 | 1/1991 | Reising | 604/368 |
| 5,114,781 | 5/1992 | Morman | 428/198 |
| 5,118,376 | 6/1992 | Pigneul et al. | 156/219 |
| 5,188,874 | 2/1993 | Kauffman et al. | 156/257 X |
| 5,188,885 | 2/1993 | Timmons et al. . | |
| 5,226,992 | 7/1993 | Morman | 156/181 X |
| 5,284,703 | 2/1994 | Everhart et al. | 428/283 |
| 5,320,891 | 6/1994 | Levy et al. | 428/108 |
| 5,324,580 | 6/1994 | Allen et al. | 156/167 X |
| 5,393,599 | 2/1995 | Quantrille et al. | 156/229 X |
| 5,431,991 | 7/1995 | Quantrille et al. | 428/109 |
| 5,536,555 | 7/1996 | Zelazoski et al. | 156/229 X |

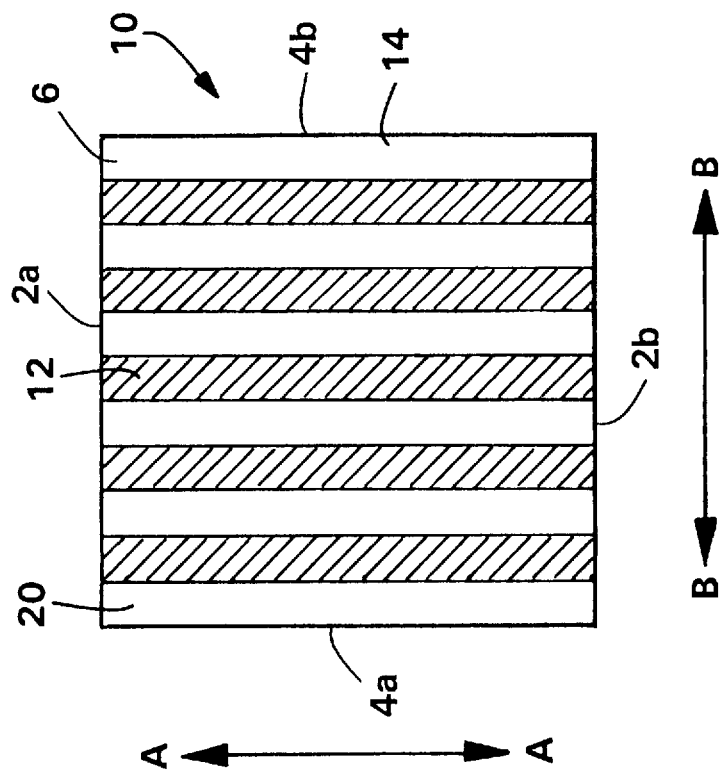
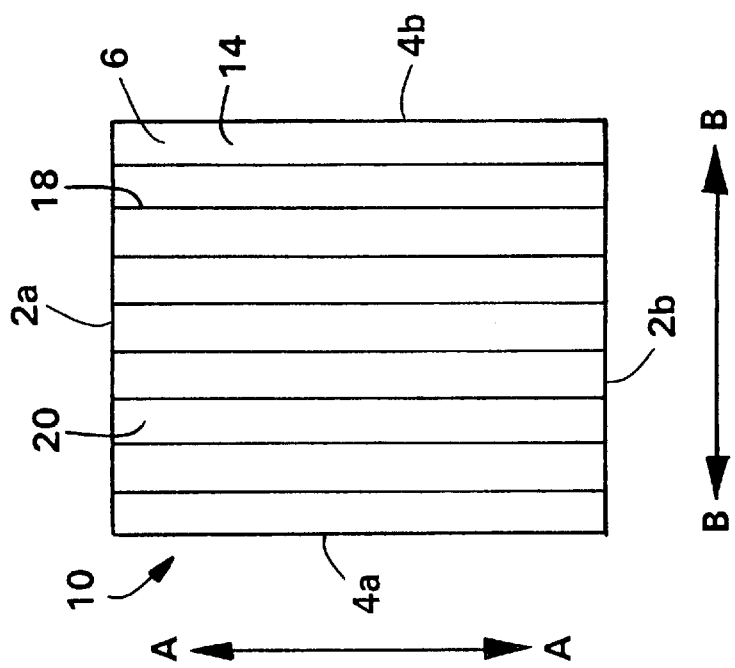

SLIT ELASTIC FIBROUS NONWOVEN LAMINATES AND PROCESS FOR FORMING

This application is a continuation of application Ser. No. 08/236,785 entitled "Slit Elastic Fibrous Nonwoven Laminates" and filed in the U.S. Patent and Trademark Office on Apr. 29, 1994, now abandoned.

FIELD OF THE INVENTION

The present invention is directed to elastic fibrous nonwoven laminates. More particularly, the present invention is directed to elastic fibrous nonwoven laminates that are elastic in at least one direction and, if desired, two directions due to the use of at least one fibrous nonwoven layer which contains a plurality of slits.

BACKGROUND OF THE INVENTION

Fibrous nonwoven webs are used in an ever increasing number of applications. Examples of such applications include, but are not limited to, workwear and other types of clothing, especially where such products are limited-use and/or disposable. Other applications include health care related items such as medical or surgical drapes, gowns, masks, footwear and headwear and personal care products such as diapers, training pants, incontinence garments, sanitary napkins, bandages and wipers. In many of these and other applications there is often a need for a fibrous nonwoven web which is elastic in nature. By elastic it is meant a material which has a relaxed or first length and which is capable of being stretched or expanded to a second length and then, upon release of the stretching forces, the material is able to retract back to a third length which is equal to or greater than the first length but less than the second length.

There are many examples of fibrous nonwoven webs and laminates which are stretchable and/or elastic. Stretchable materials are distinguishable from elastic materials in that stretchable materials can be expanded in length but they do not necessarily retract back from their expanded length. The methods for making such materials elastic are varied. It is possible to make elastic films and elastic fibrous nonwoven webs. These elastic films and nonwovens often have elastic properties in multiple directions but are also oftentimes lacking in other properties which would make them useful as end use products or components in end use products. As a result, one solution has been to incorporate such elastic materials into laminates. The assignee of record, Kimberly-Clark Corporation, makes a number of materials called stretch-bonded laminates in which one or more gatherable layers are attached at spaced apart points to an elastic layer while the elastic layer is in an expanded state. Once the gatherable layers have been securely attached to the elastic layer, the elastic layer is allowed to relax, thereby causing a plurality of gathers or puckers to form in the outer layer or layers and thus creating a laminate which is stretchable and elastic in at least one direction. In contrast, however, it would be desirable to have an elastic nonwoven laminate which was flatter and devoid of puckers while still having elastic properties.

It is also possible to create laminates which have elastic properties in two directions, however, the processes for forming such materials are significantly more complicated. One method is called neck bonding wherein the outer layers are stretched until they "neck in" in the machine cross direction before they are attached to the elastic interior layer. As a result, the laminate becomes stretchable in the cross machine direction.

Despite the foregoing processes for forming elastic laminates there is a need for yet additional processes which can quickly and simply create elastic laminates.

SUMMARY OF THE INVENTION

Disclosed herein is an elastic fibrous nonwoven laminate that is elastic in at least one direction and, if desired, two directions due to the use of at least one fibrous nonwoven layer which contains a plurality of slits. Conventional elastomeric nonwoven laminates typically have an elastic layer and a non-elastic layer with the non-elastic layer being bonded to the elastic layer at a plurality of spaced-apart locations while the elastic layer is in a stretched condition. As a result, when the stretching forces are released, the laminate retracts and the non-elastic layer puckers or gathers thereby creating an undulating surface. The present invention uses a nonwoven facing layer containing a plurality of slits and is bonded to an elastic substrate layer while the elastic substrate layer is in a relaxed state. Once the two layers have been laminated to one another, the laminate or composite can be stretched in a direction which is generally perpendicular to the direction of the slits in the nonwoven facing layer. At the same time, because there are no gathers or puckers, the laminate has a flat surface and thus an aesthetically pleasing appearance in both the stretched and unstretched states.

The elastic, fibrous nonwoven laminate includes an elastic substrate layer and a first nonwoven facing layer attached to the elastic substrate layer to form a laminate. The first nonwoven facing layer includes a plurality of slits. The slits in the first nonwoven facing layer can be continuous slits so as to form a plurality of narrow strips of nonwoven facing material or the slits can be discontinuous in a variety of patterns including, but not limited to, an overlapping brick pattern. It is also possible to create discontinuous slits in a number of directions in the nonwoven facing layer. Yet a further alternative is to create slits which are both a combination of continuous and discontinuous slits.

In the most basic configuration, the first nonwoven facing layer is attached to the elastic substrate layer while the elastic substrate layer is in a nonstretched condition to create a two layer laminate. Once the laminate has been formed, it is possible to expand the laminate in a direction which is generally perpendicular to the direction of the slits. If desired, additional elastic properties can be imparted to the laminate by stretching the elastic substrate layer prior to its attachment to the first nonwoven facing layer. Generally this stretching will be in a direction which is parallel to the direction of the slits in the first nonwoven facing layer. As a result, once the two layers have been attached to one another, the first nonwoven facing layer will have a plurality of gathers or puckers which will permit expansion of the laminate in the same direction that the substrate layer was stretched prior to its attachment to the first nonwoven facing layer. The same laminate will also have elastic properties in the other direction due to the expansion of the slits when stretching forces are applied to the laminate in a direction which is generally perpendicular to the direction of the slits. Besides creating a two layer laminate, it is also possible to create a three layer laminate by attaching a second slit fibrous nonwoven facing layer to a surface of the elastic substrate layer which is opposed to the first nonwoven facing layer.

The process for forming such elastic, fibrous nonwoven laminates involves creating a first plurality of slits in a first nonwoven facing layer and then attaching an elastic substrate layer to the first nonwoven facing layer. If desired, a second plurality of slits can be created in a second nonwoven facing layer. This second nonwoven facing layer can then be attached to a surface of the elastic substrate layer which is opposed to the first nonwoven facing layer so as to create a three layer laminate. As still a further process variation, it is possible to stretch the elastic substrate layer and then attach the nonwoven facing layers to the elastic substrate layers while the elastic substrate layer is in a stretched state. As a result, elastic properties can be imparted in two directions with the elastic properties in one direction being dependent upon the formation of the slits in the nonwoven facing layers and the elastic properties in the other direction being dependent upon the stretching of the elastic substrate layer prior to its attachment to the nonwoven facing layers.

Laminates such as are described above and in further detail below are suitable for a wide variety of the uses mentioned above, not the least of which include components in personal care products including diapers, training pants, incontinence garments, sanitary napkins, bandages and the like. Other uses include, for example, utilizing the laminate in the form of a medical drape.

BRIEF DESCRIPTION OF THE DRAWINGS

FIG. 3 is a top plan view of another slit elastic fibrous nonwoven laminate according to the present invention.

FIG. 4 shows the slit elastic fibrous nonwoven laminate of FIG. 3 being stretched along line B—B.

DETAILED DESCRIPTION OF THE INVENTION

Figure 1:
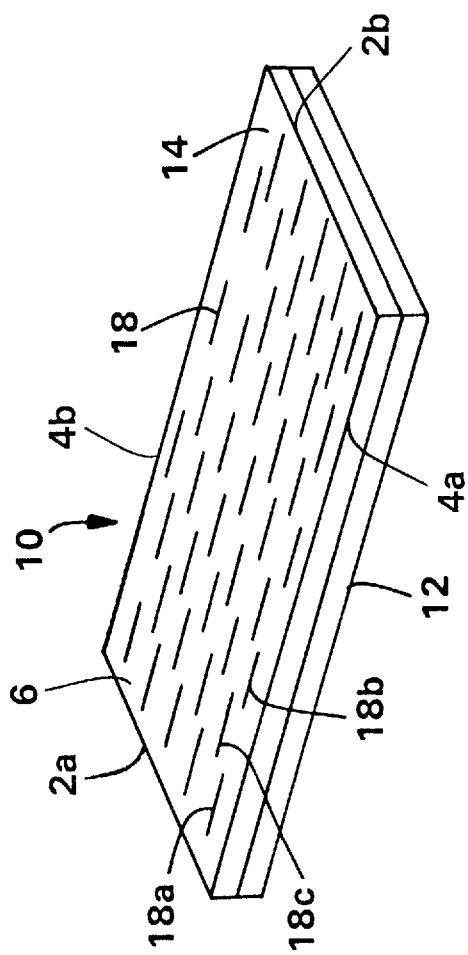
FIG. 1 is a perspective view of a slit elastic fibrous nonwoven laminate according to the present invention.

Referring to FIG. 1 there is shown an elastic, fibrous nonwoven laminate 10 according to the present invention including an elastic substrate layer 12 and at least a first fibrous nonwoven web facing layer 14. If desired, additional layers may be attached to the laminate 10 as, for example, a second fibrous nonwoven facing layer 16 on a surface of the elastic substrate layer 12 which is opposed to the first facing layer 14. See FIG. 7. For purposes of clarity the term "layer" will generally refer to a single piece of material but the same term should also be construed to mean multiple pieces or plies of material which, together, form one or more of the "layers" described herein.

The elastic substrate layer 12 may be made from any material or materials which are elastic in at least one direction and more desirably from materials which are elastic in two or more directions. A material or layer is considered to be "elastic" or have "elastic properties" for purposes of the present invention if it is capable of being stretched or extended from a first and generally relaxed (no external tensional force) length to a second or expanded length which is at least two times the first length and then, upon release of the stretching forces, will retract to a third length which is no greater than 110 percent of the first length or, stated differently, the third length is no greater than 1.1 times the first length. Thus, as an example, a material or layer would be elastic if it had an initial length of 100 centimeters, could be stretched to a length of at least 200 centimeters and then, upon release of the stretching forces, retracted to a length that was no greater than 110 centimeters. For purposes of the present invention, a laminate 10 is said to be "elastic" or have "elastic properties" if the laminate is capable of being stretched from a first length to a second and expanded length which is at least 1.4 times the first length and then, upon release of the stretching forces, will retract to a third length which is no greater than 1.1 times the first length. Thus, as an example, a laminate would have "elastic properties" if it had an initial length of 100 centimeters, could be stretched to a length of at least 140 centimeters and then, upon release of the stretching forces, retracted to a length that was no greater than 110 centimeters.

Suitable elastic materials for the substrate layer 12, include, but are not limited to, elastic films, elastic nonwoven webs and elastic woven webs as well as combinations of the foregoing. Generally speaking, the elastic or elastomeric webs may be any elastomeric nonwoven fibrous web, elastomeric knitted fabric, elastomeric woven fabric or other elastic material which will exhibit elastic properties. Exemplary elastomeric knitted fabrics are knitted fabrics made utilizing elastomeric threads or yarns which provide stretch and recovery properties in at least one direction. Exemplary elastomeric woven fabrics are fabrics having elastomeric warp and/or weft threads or yarns such as polyurethane threads that provide stretch and recovery properties in at least one direction. Desirably the elastic substrate layer may be made from an elastomeric nonwoven web such as an elastomeric nonwoven web of spunbonded filaments or an elastomeric nonwoven web of meltblown fibers.

Generally, any suitable elastomeric fiber forming resins or blends containing the same may be utilized to form the nonwoven webs of elastomeric fibers of the present invention. For example, useful elastomeric fiber forming resins can include block copolymers having the general formula A—B—A' or A—B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A—B—A' type can have different or the same thermoplastic block polymers for the A and A' blocks, and these block copolymers are intended to embrace linear, branched and radial block copolymers. In this regard, the is a polyfunctional atom or molecule and in which each $(A-B)_m$—radiates from X in a way such that A is an endblock. In the radial block copolymer, X may be an organic or inorganic polyfunctional atom or molecule and m is an integer having the same value as the functional group originally present in X. It is usually at least 3, and is frequently 4 or 5, but is not limited thereto. Thus, in the present invention, the expression "block copolymer", and particularly "A—B—A'" and "A—B" block copolymer is intended to embrace all block copolymers having such rubbery blocks and thermoplastic blocks as discussed above which can be extruded (e.g., by meltblowing), and without limitation as to the number of blocks. The elastomeric nonwoven web may be formed from, for example, elastomeric (polystyrene/poly(ethylene-butylene)/polystyrene) block copolymers available from the Shell Chemical Company of Houston, Texas under the trade designation KRATON® G. One such block copolymer may be, for example, KRATON® G-1657 copolymer.

Other exemplary elastomeric materials which may be used to form an elastomeric nonwoven web include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation HYTREL® from E. I. DuPont De Nemours & Company. Formation of an elastomeric nonwoven web from polyester elastomeric materials is disclosed in, for example, U.S. Pat. No. 4,741,949 to Morman et al. which is incorporated herein by reference in its entirety. Elastomeric nonwoven webs may also be formed from elastomeric copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117 which is also incorporated herein by reference in its entirety.

Processing aids may be added to the elastomeric polymer. For example, a polyolefin may be blended with the elastomeric polymer (e.g., the A—B—A elastomeric block copolymer) to improve the processability of the composition. The polyolefin must be one which, when so blended and subjected to an appropriate combination of elevated pressure and elevated temperature conditions, is extrudable in blended form with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601. Two or more of the polyolefins may be utilized. Extrudable blends of elastomeric polymers and polyolefins are disclosed in, for example, U.S. Pat. No. 4,663,220 to Wisneski et al. which is hereby incorporated by reference in its entirety.

The elastomeric nonwoven web may also be a pressure sensitive elastomer adhesive web. For example, the elastomeric material itself may be tacky or, alternatively, a compatible tackifying resin may be added to the extrudable elastomeric compositions described above to provide an elastomeric web that can act as a pressure sensitive adhesive, e.g, to bond the elastomeric web to one of the fibrous nonwoven facing layers. In regard to the tackifying resins and tackified extrudable elastomeric compositions, note the resins and compositions as disclosed in U.S. Pat. No. 4,787,699 to Kieffer which is hereby incorporated by reference in its entirety.

Any tackifier resin can be used which is compatible with the elastomeric polymer and which can withstand the high processing (e.g., extrusion) temperatures. If the elastomeric polymer (e.g., A—B—A elastomeric block copolymer) is blended with processing aids, such as for example, polyolefins or extending oils, the tackifier resin should also be compatible with those processing aids. Generally, hydrogenated hydrocarbon resins are preferred tackifying resins because of their better temperature stability. REGALREZ® and ARKON® P series tackifiers are examples of hydrogenated hydrocarbon resins. ZONATAK® 501 lite polymer is an example of a terpene hydrocarbon and is available from Arizona Chemical Company of Wayne, N.J. REGALREZ® hydrocarbon resins are available from Hercules Incorporated of Wilmington, Del. ARKON® P series resins are available from Arakawa Chemical (U.S.A) Incorporated. Of course, the present invention is not limited to the use of these specific tackifying resins, and other tackifying resins which are compatible with the other components of the composition and which can withstand the high processing temperatures can also be used.

The elastomeric fabric may also be a multilayer material in that it may include two or more individual coherent webs and/or films. Additionally, the elastomeric fabric may be a multilayer material in which one or more of the layers contain a mixture of elastomeric and non-elastomeric fibers or particulates. As an example of the latter type of elastomeric web, reference is made to U.S. Pat. No. 4,209,563 to Sisson, which is incorporated herein by reference in its entirety, in which elastomeric and non-elastomeric fibers are commingled to form a single coherent web of randomly dispersed fibers. Another example of such an elastomeric composite web would be one made by a technique such as is disclosed in U.S. Pat. No. 4,741,949 to Morman et al. and U.S. Pat. Nos. 4,100,324 to Anderson et al. and 4,803,117 to Daponte, the contents of which are incorporated herein by reference in their entirety. These patents disclose nonwoven materials which include a mixture of meltblown thermoplastic fibers and other materials. Such mixtures may be formed by adding fibers and/or particulates to the gas stream in which elastomeric meltblown fibers are carried so that an intimate entangled commingling of the elastomeric meltblown fibers and other materials occurs prior to collection of the meltblown fibers upon a collection device to form a coherent web of randomly dispersed meltblown fibers and other materials. Useful materials which may be used in such nonwoven elastomeric composite webs include, for example, wood pulp fibers, staple length fibers from natural and synthetic sources (e.g. cotton, wool, asbestos, rayon, polyester, polyamide, glass, polyolefin, cellulose derivatives and the like), non-elastic meltblown fibers, multi-component fibers, absorbent fibers, electrically conductive fibers, and particulates such as, for example, activated charcoal/carbon, clays, starches, metal oxides, superabsorbent materials and mixtures of such materials. Other types of nonwoven elastomeric composite webs may be used. For example, a hydraulically entangled nonwoven elastomeric composite web may be used such as is disclosed in U.S. Pat. Nos. 4,879,170 and 4,939,016 both to Radwanski, et al. the contents of which are incorporated herein by reference in their entirety.

If the elastomeric nonwoven web is an elastomeric nonwoven web of meltblown fibers, the meltblown fibers may range, for example, from about 0.1 to about 100 microns in diameter. However, if barrier properties are important in the finished laminate (for example, if it is important that the final laminate material have increased opacity and/or insulating and/or dirt protection and/or liquid repellency), then finer fibers which may range, for example, from about 0.5 to about 20 microns can be used.

The basis weight of the elastomeric fabric may range from about 5 to about 250 grams per square meter. The basis weight can be varied, however, to provide desired properties including recovery and barrier properties, desirably, the basis weight of the elastomeric fabric may range from about 30 to about 100 grams per square meter. Even more particularly, the basis weight of the elastomeric fabric may range from about 35 to about 70 grams per square meter. The extreme thinness of the low basis weight elastomeric nonwoven webs which may be used in certain embodiments of the invention would appear to enhance the material properties of drape and conformability.

In addition to elastic films and nonwovens, elastic wovens also may be used with the present invention. Woven materials are distinguishable from nonwovens given the deliberate and uniform pattern by which the fibers, yarns or filaments are intertwined. Conversely, nonwoven materials are formed from fibers which, at least initially, are laid down in a random pattern and then usually further strengthened by increased entanglement as with hydroneedling and/or bonding of the fibers together.

Besides being elastic, the only other requirement for the substrate layer 12 is that it can be attachable to the facing layers 14 and 16. Where it is desired to have the overall laminate 10 be breathable, it is generally desirable to make the elastic substrate layer from a nonwoven or woven though it is also possible to make films breathable, as, for example, by perforating the films.

Attached to the elastic substrate layer 12 is at least a first fibrous nonwoven web facing layer 14. Generally the facing layer 14 will not be elastic in that it will not meet the requirements of the aforementioned definition of an elastic material prior to being slit. The basis weight of the facing layer 14 will depend upon the particular end use. The process used to form the fibrous nonwoven web facing layer is left to the discretion of the manufacturer and the design parameters of the overall laminate 10 and/or the particular end product. Generally, it has been found that bonded carded webs and spunbond webs work particularly well as facing layers. The properties of these webs can be further enhanced by forming the webs from all or a portion of multiconstituent and/or multicomponent fibers such as biconstituent and bicomponent fibers. Biconstituent fibers are extruded from a homogeneous mixture of two different polymers. Such fibers combine the characteristics of the two polymers into a single fiber. Bicomponent or composite fibers are composed of two or more polymer types in distinct areas of the fiber such as in a side-by-side or sheath-core configuration.

The processes used to form the fibrous nonwoven web facing layers include those which will result in a material which, as further described below, has the necessary range of physical properties. Suitable processes include, but are not limited to, airlaying, spunbonding and bonded carded web formation processes. Spunbond nonwoven webs are made from fibers which are formed by extruding a molten thermoplastic material as filaments from a plurality of fine capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763 and Dobo et al., U.S. Pat. No. 3,542,615 all of which are incorporated herein by reference in their entirety.

The spunbond process also can be used to form bicomponent spunbond nonwoven webs as, for example, from side-by-side polyethylene/polypropylene spunbond bicomponent fibers. The process for forming such fibers and resultant webs includes using a pair of extruders for separately supplying both the polyethylene and the polypropylene to a bicomponent spinnerette. Spinnerettes for producing bicomponent fibers are well known in the art and thus are not described herein in detail. In general, the spinnerette includes a housing containing a spin pack which includes a plurality of plates having a pattern of openings arranged to create flow paths for directing the high melting temperature and low melting temperature polymers to each fiber-forming opening in the spinnerette. The spinnerette has openings arranged in one or more rows and the openings form a downwardly extending curtain of fibers when the polymers are extruded through the spinnerette. As the curtain of fibers exit the spinnerette, they are contacted by a quenching gas which at least partially quenches the fibers and develops a latent helical crimp in the extending fibers. Oftentimes the quenching air will be directed substantially perpendicularly to the length of the fibers at a velocity of from about 30 to about 120 meters per minute at a temperature between about 7° and about 32° C.

A fiber draw unit or aspirator is positioned below the quenching gas to receive the quenched fibers. Fiber draw units or aspirators for use in meltspinning polymers are well known in the art. Exemplary fiber draw units suitable for use in the process include linear fiber aspirators of the type shown in U.S. Pat. No. 3,802,817 to Matsuki et al. and eductive guns of the type shown in the U.S. Pat. Nos. 3,692,618 to Dorshner et al. and 3,423,266 to Davies et al. all of which are incorporated herein by reference in their entirety. The fiber draw unit in general has an elongated passage through which the fibers are drawn by aspirating gas. The aspirating gas may be any gas, such as air that does not adversely interact with the polymers of the fibers. The aspirating gas can be heated as the aspirating gas draws the quenched fibers and heats the fibers to a temperature that is required to activate the latent crimps therein. The temperature required to activate the latent crimping within the fibers will range from about 43° C. to a maximum of less than the melting point of the low melting component polymer which, in this case, is the polyethylene. Generally, a higher air temperature produces a higher number of crimps per unit length of the fiber.

The drawn and crimped fibers are deposited onto a continuous forming surface in a random manner, generally assisted by a vacuum device placed underneath the forming surface. The purpose of the vacuum is to eliminate the undesirable scattering of the fibers and to guide the fibers onto the forming surface to form a uniform unbonded web of bicomponent fibers. If desired, the resultant web can be lightly compressed by a compression roller before the web is subjected to a bonding process.

One way to bond the bicomponent spunbonded web is through the use of a through-air bonder. Such through-air bonders are well known in the art and therefore need not be described herein in detail. In the through-air bonder, a flow of heated air is applied through the web to heat the web to a temperature above the melting point of the lower melting point component of the bicomponent fibers but below the melting point of the higher melting point component. Upon heating, the lower melting polymer portions of the web fibers melt and adhere to adjacent fibers at their cross-over points while the higher melting polymer portions of the fibers tend to maintain the physical and dimensional integrity of the web.

The facing layers also may be made from bonded carded webs. Bonded carded webs are made from staple fibers which are usually purchased in bales. The bales are placed in a picker which separates the fibers. Next, the fibers are sent through a combing or carding unit which further breaks apart and aligns the staple fibers in the machine direction so as to form a generally machine direction-oriented fibrous nonwoven web. Once the web has been formed, it is then bonded by one or more of several bonding methods. One bonding method is powder bonding wherein a powdered adhesive is distributed through the web and then activated, usually by heating the web and adhesive with hot air. Another bonding method is pattern bonding wherein heated calender rolls or ultrasonic bonding equipment are used to bond the fibers together, usually in a localized bond pattern though the web can be bonded across its entire surface if so desired. One of the best methods though, when using bicomponent staple fibers is to use a through-air bonder such as is described above with respect to the bicomponent spunbond web formation process.

In order to obtain the specified range of physical properties of the resultant fibrous nonwoven web according to the present invention, the bonding process used to bond the fibers of the fibrous nonwoven web together should be a process such as through-air bonding which can control the level of compression or collapse of the structure during the formation process. In through-air bonding, heated air is forced through the web to melt and bond together the fibers at their crossover points. Typically the unbonded web is supported on a forming wire or drum. In addition a vacuum may be pulled through the web if so desired to further contain the fibrous web during the bonding process.

Bonding processes such as point bonding and pattern bonding using smooth and/or pattern bonding rolls can be used provided such processes will create the specified range of physical properties for the present invention. Whatever process is chosen, the degree of bonding will be dependent upon the fibers/polymers chosen but, in any event, it is desirable that the amount of web compression be controlled during the heating stage.

Airlaying is another well known process by which fibrous nonwoven webs according to the present invention can be made. In the airlaying process, bundles of small fibers usually having lengths ranging between about 6 and about 19 millimeters are separated and entrained in an air supply and then deposited onto a forming screen, oftentimes with the assistance of a vacuum supply. The randomly deposited fibers are then bonded to one another using, for example, hot air or a spray adhesive.

Figure 6:
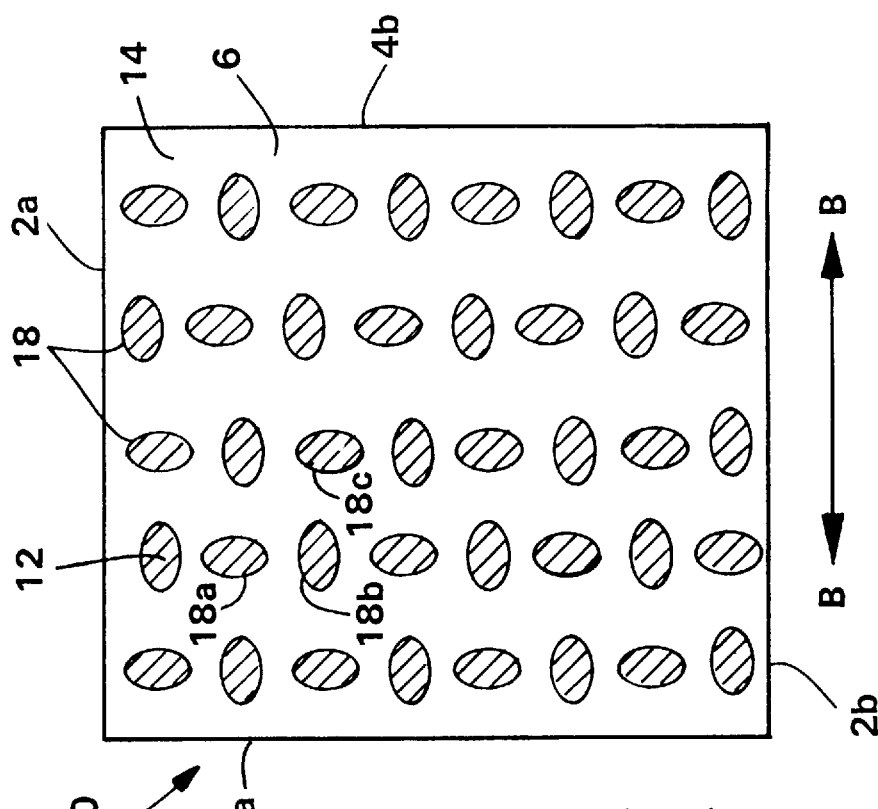
FIG. 6 shows the slit elastic fibrous nonwoven laminate of FIG. 5 being stretched along lines A—A and B—B.
Figure 5:
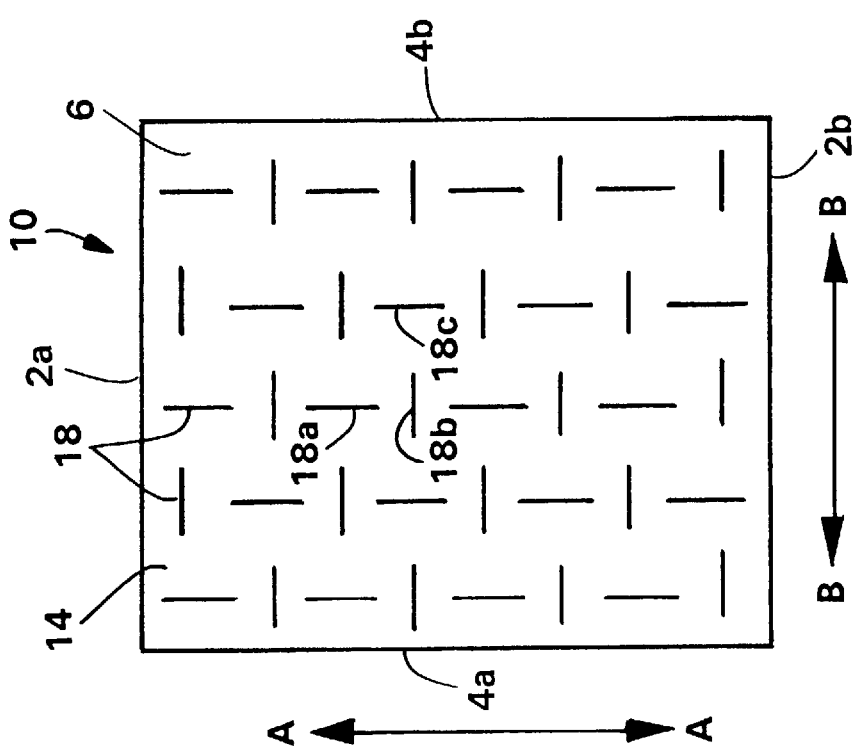
FIG. 5 is a top plan view of another slit elastic fibrous nonwoven laminate according to the present invention.
Figure 7:
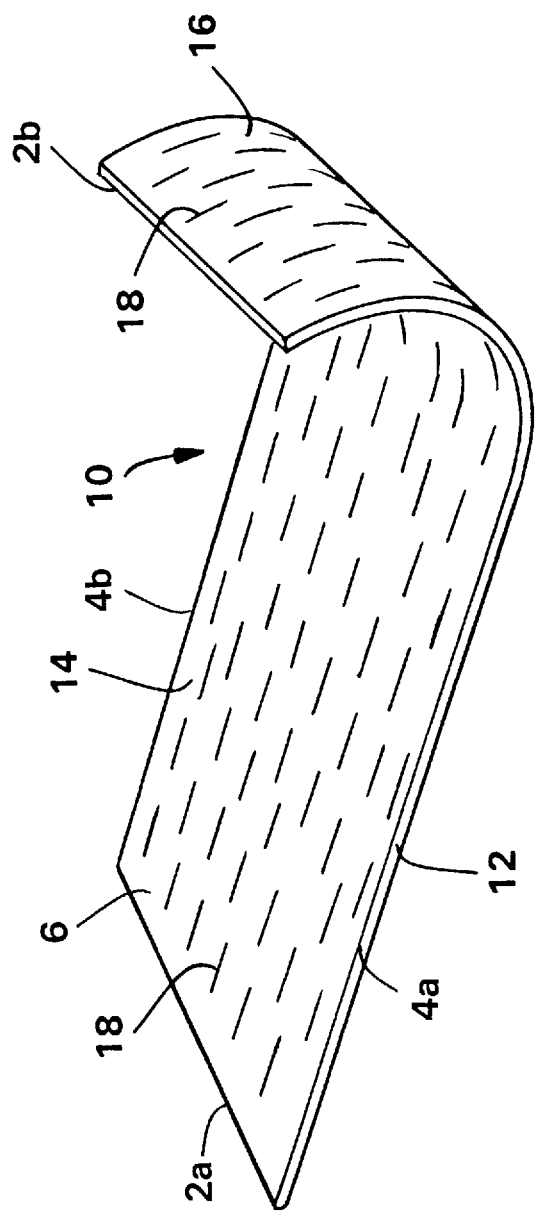
FIG. 7 is a perspective view of yet another slit elastic fibrous nonwoven laminate according to the present invention.
Figure 8:
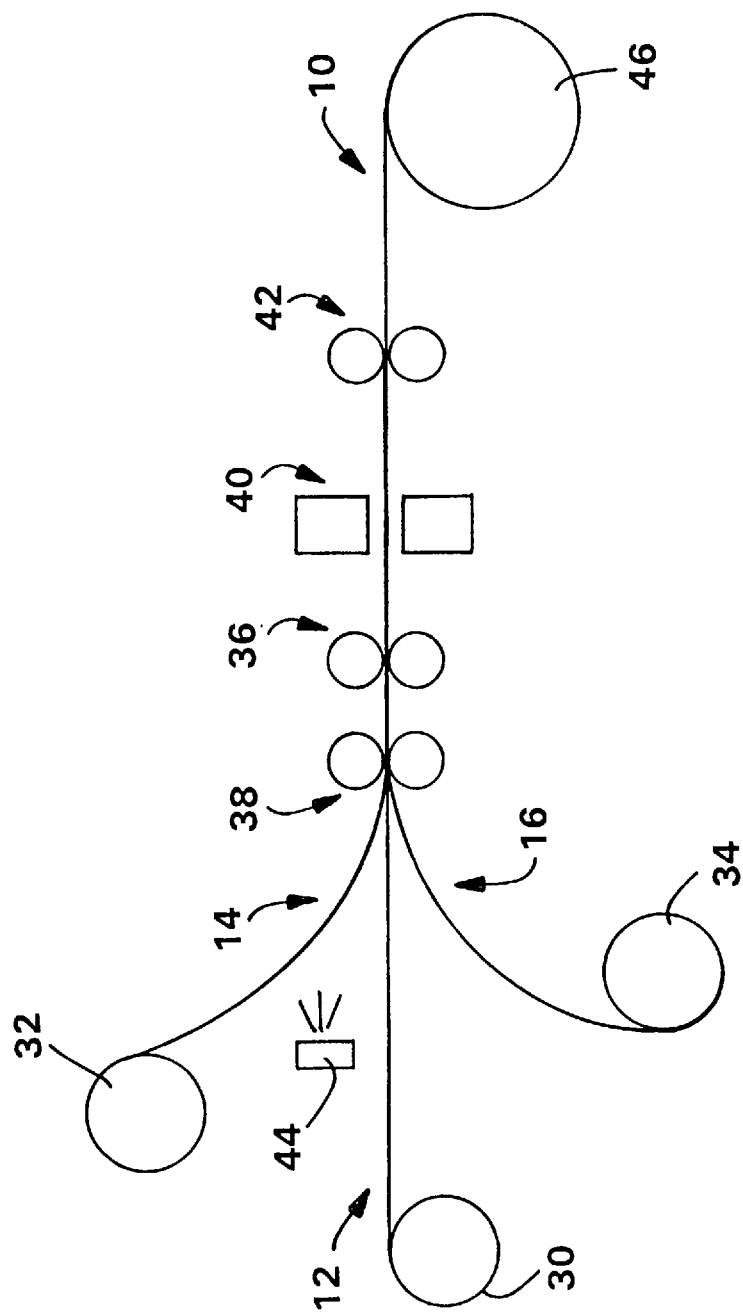
FIG. 8 is a schematic side view of a process for forming a slit elastic fibrous nonwoven laminate according to the present invention.

Having described the various components of the laminate 10, a process for forming a laminate 10 according to the present invention is shown in FIG. 8. A layer of elastic substrate layer 12 is unrolled from a supply roll 30 and fed through a pair of drive and compaction rolls 36. Alternatively, the elastic substrate layer 12 may be formed directly in-line. Next, a supply of a first fibrous nonwoven web facing layer 14 is unrolled from a supply roll 32 or it also may be formed in-line. Before the facing layer 14 is passed through the drive rolls 36 it must be slit. The slits 18 may be discontinuous such as are shown in FIGS. 1, 5 and 7 or continuous such as are shown in FIG. 3. A slit 18 is "discontinuous" if, as shown, for example, in FIGS. 1, 5 and 7, the length of the slit is insufficient to extend continuously from one longitudinal edge 2a or transverse edge 4a of the facing layer 14 to an opposing longitudinal edge 2b or transverse edge 4b, respectively. More specifically, as shown in FIGS. 1 and 7, a set of individual discontinuous slits 18 may be placed in a series or plurality of generally parallel rows extending from one edge of the facing layer 14 to an opposing edge. For example, slits 18a and 18b are placed in one row, while slit 18c is placed in a different row oriented generally parallel to the row including slits 18a and 18b. Each row of individual discontinuous slits 18 includes a plurality of such slits that can be regularly spaced from one facing layer edge to the opposing facing layer edge to impart extensibility to the nonwoven facing layer 14 in a direction generally perpendicular to the direction of the slits. Due to the placement of individual discontinuous slits between the edges of the facing layer 14 the resulting laminate 10 exhibits extensibility or elastic properties not just along the edges 2a and 2b 4a and 4b, but across exposed surface 6 of the laminate 10 (see, e.g., FIG. 2). As shown in FIG. 5, a first set of individual discontinuous slits may be placed in a first series or plurality of generally parallel rows extending from one longitudinal edge 2a of the facing layer 14 to opposing longitudinal edge 2b, and a second set of individual discontinuous slits may be placed in a second series or plurality of generally parallel rows extending from one transverse edge 4a of the facing layer 14 to opposing transverse edge 4b, wherein the first and second sets of discontinuous sits are generally perpendicular in orientation. Again, the pattern of first and second sets of discontinuous slits 18 provides the laminate 10 with extensibility or elastic properties across surface 6 of the laminate 10 (see, e.g., FIG. 6). Alternatively, a slit is "continuous" if, as shown, for example, in FIG. 3, the length of the slit 18 is sufficient to extend continuously from one longitudinal edge 2a of the facing layer 14 to an opposing longitudinal edge 2b. Although not shown in the Figures, such continuous slits 18 could be oriented to extend continuously from one transverse edge 4a of the facing layer 14 to an opposing transverse edge 4b. A plurality of generally parallel rows of such continuous slits 18 provides the laminate 10 with extensibility or elastic properties across surface 6 in a direction generally perpendicular to the direction of slits 18. These slits 18 may be preformed or formed directly in-line as by a slitting roll or other means 38. It is possible to create the slits after the formation of the laminate too. A particularly advantageous slit pattern is one wherein the slits are formed in what is generally referred to as an "overlapping brick pattern." In this pattern the slits in one row overlap the gaps between the slits in an adjacent row. This pattern provides good expansion of the facing layer and the overall laminate. When making continuous slits 18 such as are shown in FIG. 3 it is particularly advantageous to perform the slitting in-line just before bonding to the substrate layer 12. Otherwise, handling of the thin strips 20 (See FIG. 3) may be difficult.

Once the two layers 12 and 14 have been brought together they must be attached to one another. Attachment can be by any suitable means such as heat bonding, ultrasonic bonding, adhesive bonding or other suitable means. The degree of attachment should be sufficient to maintain attachment during subsequent use of the laminate but not to such a degree as to prevent the slits 18 from opening up in the manner shown in FIGS. 2, 4 and 6.

As shown in FIG. 8, the attachment means in the process includes a heating apparatus 40 for providing hot air and a pair of compaction rolls 42. The surface of the compaction rolls may be smooth and/or patterned. In addition, they may be heated in which case the heating apparatus 40 may be deleted. If a spray adhesive is used, the delivery system 44 must be positioned such that the adhesive is applied to the interior surfaces of the substrate layer 12 and first facing layer 14. Other means for attaching the layers together include but are not limited to ultrasonic bonding, infrared bonding, radio frequency bonding, powdered adhesive bonding, hydroentangling, mechanical entangling such as needling and direct forming of one layer onto another. Once the two layers 12 and 14 have been attached to one another, the resultant laminate 10 may be wound up on a take-up roll 46 or the laminate 10 may remain in-line for further processing.

Figure 9:
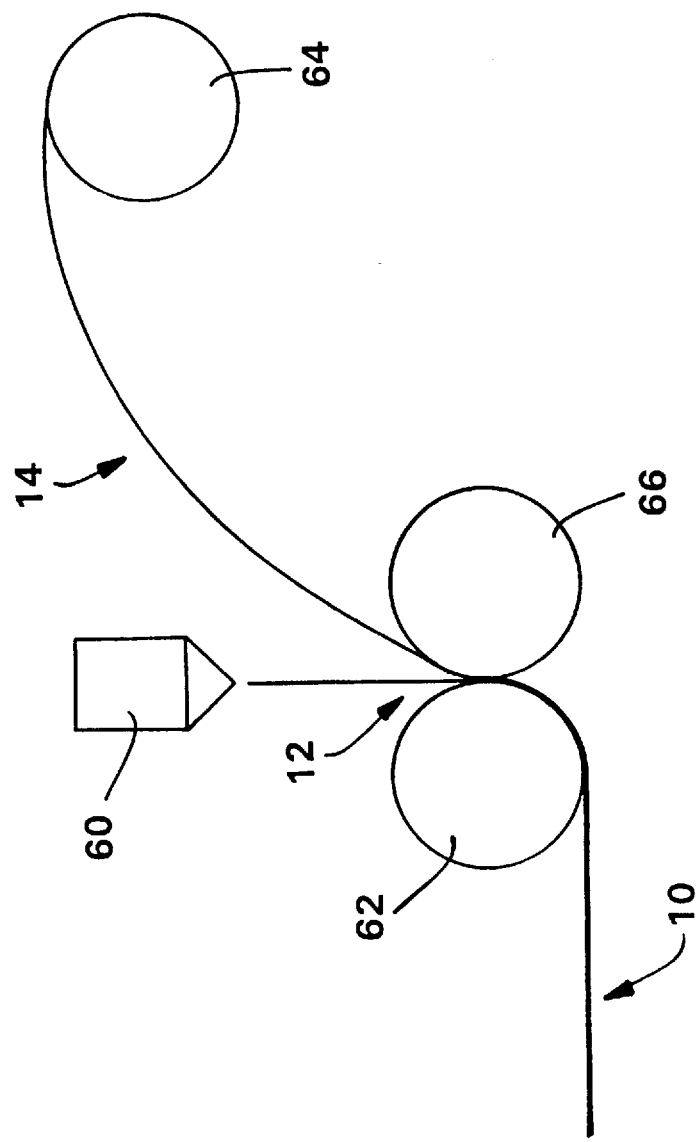
FIG. 9 is a schematic side view of another process for forming a slit elastic fibrous nonwoven laminate according to the present invention.

Another process for forming a laminate according to the present invention is shown in FIG. 9 of the drawings. In this process the elastic substrate layer 12 is an extruded film emitted from a film die 60. The molten polymer is brought in contact with a chill roll 62 to help solidify the molten polymer. At the same time, a supply 64 of slit nonwoven facing layer material 14 is brought into contact with the still tacky elastic film material 12 between the chill roll 62 and a second roll 66, such as an 85 Shore A rubber roll, which may or may not be chilled. By "chilled" it is meant that the roll 62 or 66 has a temperature which is less than the melting point of the film polymer. As a result of the elastic properties in the film layer 12, a laminate 10 is formed which will at least have elastic properties in the cross-direction (CD) which is along line B—B in FIG. 2.

Suitable polymers for forming elastic films include both natural materials (rubber, etc.) and synthetic polymers which will yield a film with elastic properties as defined above. Thus, many of the polymers such as the Kraton® polymers mentioned above with respect to the formation of elastomeric fibers also can be used to form elastomeric films.

As stated at the outset, the elastic substrate layer 12 may have elastic properties in only one direction or in multiple directions. If the elastic substrate layer 12 is only elastic in one direction, then at least a portion of the slits 18 in the facing layer 14 should be generally perpendicular to the direction of elasticity in the elastic substrate layer 12. By "generally perpendicular" it is meant that the angle between the longitudinal axis of the chosen slit or slits and the direction of elasticity is between 60° and 120°. In addition, when it is said that "at least a portion of the plurality of slits must be generally perpendicular to the direction of elasticity or stretch", it is meant that there must be a sufficient number of the described slits which are generally perpendicular such that the overall laminate has "elastic properties". Thus, in FIG. 2, if the elastic substrate layer 12 is only elastic in one direction, that direction must be generally along line B—B and not A—A. By placing the direction of elasticity along line B—B, the slits 18 are generally perpendicular to the direction of elasticity. As a result, when stretching forces are applied along line B—B, the slits 18 will open up and permit the laminate 10 to expand in the same direction. Placing the direction of elasticity of substrate 12 along line A—A would not make this possible.

The same rationale also applies to the laminate shown in FIGS. 3 and 4. Here again if the elastic substrate layer 12 is only elastic in one direction, that direction must be generally aligned with line B—B and not A—A.

In FIG. 5, the fibrous nonwoven facing layer 14 has slits in two directions. One set of slits 18 are generally perpendicular to line A—A while the other set of slits 18 are generally perpendicular to line B—B. This type of slit pattern is particularly advantageous when the elastic substrate layer 12 is elastic in at least two directions as, for example, along lines A—A and B—B. As can be seen from FIG. 6, in this configuration, the resultant laminate 10 is capable of exhibiting "elastic properties" in two directions.

In some end use situations, it may be desirable to have an elastic laminate with greater stretch in the machine direction A—A than can be achieved by a plurality of slits 18 perpendicular to the direction A—A in the facing layer 14. In this case, the expansion in the cross machine direction B—B is provided by such slits, generally aligned perpendicular to the direction B—B. However, the desired stretch in the direction A—A is achieved by placing the elastic substrate layer 12 under tension during its attachment to the fibrous nonwoven layer 14. This can be accomplished by driving supply roll 30 and either drive rolls 36 or compaction rolls 42 at different speeds or by braking supply roll 30. In so doing, the elastic substrate layer 12 is stretched in the machine direction. While the elastic substrate layer 12 is in an expanded state, the facing layer 14 is attached to the substrate layer 12, desirably at a plurality of spaced apart locations. Once the two layers have been attached to one another, the tensional forces are removed and the resultant laminate 10 is allowed to retract, thereby forming a plurality of gathers or puckers (not shown) in the facing layer 14. When the resultant laminate 10 is stretched in the machine direction, the elastic substrate layer 12 can be expanded until the slack provided by the gathers or puckers is depleted. When the tensional forces in the machine direction are removed, the elastic substrate layer 12 retracts and the gathers or puckers in the facing layer 14 reappear. A more detailed description of this process can be found in U.S. Pat. No. 4,720,415 to Taylor et al. which is incorporated herein by reference in its entirety.

By applying the tensional forces to the elastic substrate layer 12, elastic properties can be imparted to the laminate 10 in FIGS. 1 through 4 along lines A—A which is also parallel to the machine direction of the process shown in FIG. 8. To impart elastic properties to the laminate 10 in the machine cross direction (along line B—B) the roll 32 of facing layer 14 must be fed into the process of FIG. 8 such that the slits 18 are generally parallel to the machine direction of the material (line A—A) and generally perpendicular to the cross direction (line B—B). As a result, the laminate 10 will have elastic properties in the machine direction due to the stretching of the substrate layer 12 during the formation process and elastic properties in the cross direction due to the expandability of the substrate layer 12 and the slits 18 in the facing layer 14.

From the foregoing it can be seen that it is possible to create a two layer laminate 10 which exhibits elastic properties in one or more directions. It is also possible to create multi-layer laminates. For example, the process of FIG. 8 can be modified by adding a second fibrous nonwoven facing layer 16 to a surface of the elastic substrate layer 12 which is opposed to the first facing layer 14 to yield a laminate 10 such as is shown in FIG. 7. The same processing conditions and techniques can be used to apply the second facing layer 16 to the substrate layer 12 as were described with respect to the first facing layer 14. In addition, it has been found that to maximize the elastic properties of the resultant laminate 10, it is desirable that the slits 18 in the second facing layer 16 be in the same general direction and have the same general pattern as the slits 18 in the first facing layer 14.

Figure 2:
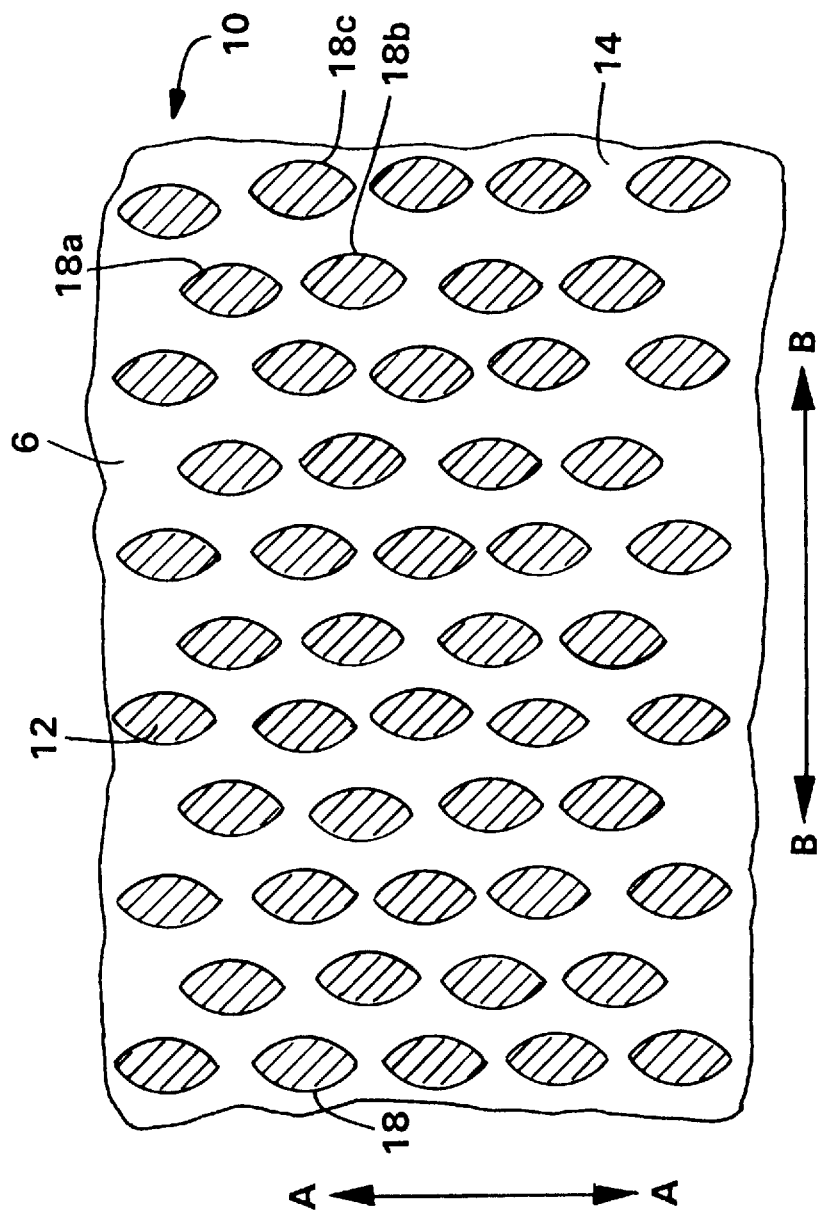
FIG. 2 is a top plan view of a slit elastic fibrous nonwoven laminate according to the present invention being stretched along line B—B.

Based upon the below examples and testing it was found that embodiments in which the facing layers 14 and 16 utilized discontinuous slits such as are shown in FIGS. 1 and 7 tended to work better than the continuous slit versions of the present invention such as are shown in FIGS. 3 and 4. Generally the nonwoven facing layers will have basis weights ranging from about 12 grams per square meter to about 210 grams per square meter with more defined ranges based upon specific end uses including from about 34 to about 100 grams per square meter and from about 50 to about 70 grams per square meter. The bicomponent fibers and especially the through-air bonded spunbond versions seemed to work quite well due to their ability to bond to one another. Generally the fiber sizes will be less than about 6 denier while in specific applications fiber sizes may be less than 3.5 denier or even 2.5 denier and below. The overlapping brick pattern of slitting such as is shown in FIGS. 1 and 2 seemed to work particularly well. In such configurations, the length of the slits typically will range between about 3 and about 50 millimeters and the distance between aligned slits in direction A—A as, for example, 18a and 18b will be less than 50 millimeters and often they will be less than 20 millimeters and in some cases less than 10 millimeters. In the direction B—B, the distance between any two adjacent slits as, for example, 18b and 18c will be less than 50 millimeters and generally less than 10 millimeters or even less than 5 millimeters. The basis weight of the elastic substrate layer can vary greatly depending upon the particular end use though, generally, the basis weight will be less than 250 grams per square meter and generally less than 100 grams per square meter and oftentimes even less than 50 grams per square meter.

From a processing standpoint when using elastic films, the process in FIG. 9 works very well. The lamination of the facing layers to the elastic substrate layer occurs in the nip while the elastic film substrate is in a semi-molten state and therefore tacky enough to provide the desired adhesion strength between the facing layers and the elastic substrate. The elastic laminate so produced will generally have a basis weight less than about 700 grams per square meter and generally less than 300 grams per square meter and oftentimes even less than 150 grams per square meter.

The elastic substrate layer itself can be laminated layers as can be the nonwoven facing layer. The outer facing layers can be used to cover the elastic substrate and impart aesthetic or protective features (abrasion resistance). These outer facings can also impart a stretch-to-stop feature. Stretch-to-stop can be important in protecting the composite from tensile failure due to overextension.

Having described the materials and process of the present invention, several sample laminates are set forth below to further illustrate the present invention. It should be understood, however, that these examples are illustrative only and are not meant to limit the breadth and scope of the present invention.

EXAMPLE 1

In example 1, an elastic, two layer fibrous nonwoven laminate was made using a process similar to that shown in FIG. 9 of the drawings. The elastic substrate layer was a 69 gram per square meter elastic film extruded from a KRATON® G 2755 elastomer made by the Shell Chemical Company of Houston, Tex. The substrate layer had elastic properties in both direction A—A and B—B depicted in FIG. 2. To the elastic film substrate layer there was laminated a 100 gram per square meter through-air bonded side-by-side polypropylene/polyethylene two denier bicomponent spunbond facing layer. The facing layer contained a plurality of slits in an overlapping brick pattern as shown, for example, in FIGS. 1 and 2. The slits were 9.5 millimeters in length and there was 6.35 millimeters between any two aligned slits in direction A—A of FIG. 2 and 3.2 millimeters in direction B—B. The facing layer and elastic film substrate layer were laminated to one another in a nip comprising a chill roll and an 85 Shore A rubber roll. The elastic film layer had just been formed and still had sufficient tack to provide the necessary degree of attachment to the facing layer. The resultant laminate had elastic properties in the cross-direction or along line B—B. The laminate had a first length of 8.5 centimeters, a fully stretched second length of 16 centimeters and a third length of 9 centimeters.

EXAMPLE 2

In Example 2, the same fibrous nonwoven facing layer was used as was used in Example 1. The elastic substrate layer in Example 2 was an elastomeric fibrous meltblown nonwoven web having a basis weight of 196 grams per square meter. The meltblown web was made from KRATON® G 2740 manufactured by the Shell Oil Company of Houston, Tex. The elastic meltblown web had elastic properties in both the A—A and B—B directions such as are shown in FIG. 2. To create stretch in the overall laminate in both the machine direction (A—A) and in the cross-direction (B—B) the elastic meltblown web was stretched in the machine direction prior to its attachment to the fibrous nonwoven facing layer. Attachment of the two layers was achieved through the use of 7 grams per square meter of a spray adhesive applied to the interior surface of one or the other of the two layers. Once the two layers had been joined to one another the laminate had elastic properties in both the machine and cross directions. In the cross-direction (B—B), the laminate had a first length of 7.5 centimeters, a fully stretched second length of 15.5 centimeters, and a recovered third length of 7.9 centimeters. In the machine direction (A—A), the laminate had a first length of 11 centimeters, a fully stretched second length of 15.8 centimeters and a third length of 11.4 centimeters.

EXAMPLE 3

In Example 3, the fibrous nonwoven facing layer was identical to the facing layer used in Examples 1 and 2 but for the basis weight. In Example 3, the basis weight of the bicomponent spunbond web was 97.6 grams per square meter versus the previous basis weight of 100 grams per square meter. The slit pattern and its dimensions were the same as that used in the previous examples. The elastic substrate layer was also the same as that used in Example 2 but for the basis weight. In Example 3, the basis weight of the elastomeric meltblown nonwoven web was 74.7 grams per square meter. In this example, while the elastic nonwoven web had elastic properties in both the A—A and B—B directions, it was not prestretched prior to its attachment to the fibrous nonwoven facing layer. As with Example 2, a spray adhesive was applied to one of the two layers in the amount of 7 grams per square meter and the two layers were adhesively laminated to one another. The elastic nonwoven laminate had a first length in direction B—B of 8.3 centimeters, a second fully stretched length of 20.4 centimeters and a recovered third length of 8.8 centimeters.

EXAMPLE 4

In Example 4 another cross direction stretchable material was formed. The nonwoven facing layer was again made from the same spunbond material as in the previous examples. It had a basis weight of 20.3 grams per square meter and the same slit pattern and dimensions as previously described. The elastic substrate layer was the same 196 gram per square meter elastic nonwoven meltblown web described in Example 2. The two layers were attached to one another using heat and pressure. The facing layer was attached to the elastic substrate layer in a Carver Model 2518 laboratory press from Fred S. Carver Inc. of Menomonee Falls, Wis. at a pressure of 30 pounds per square inch (2.07×105 Newtons per square meter) and a temperature of 49° C. The elastic laminate had a first relaxed length of 9.6 centimeters in the cross machine direction (B—B), a fully stretched second length of 20.5 centimeters and a third recovered length of 10 centimeters.

EXAMPLE 5

In Example 5, two 100 gram per square meter through-air bonded, side-by-side polypropylene/polyethylene 2.0 denier bicomponent facing layers were laminated to either side of an elastic meltblown substrate layer. The two exterior layers were the same materials described in Example 1 and the elastic meltblown substrate layer was the same material and basis weight as that described in Example 2. No stretching was imparted to the elastic substrate layer in the machine direction during application of the nonwoven facing layers. Instead, the two facing layers were applied to either side of the elastic substrate layer using 7 grams per square meter of spray adhesive applied to both sides of the substrate layer in an overall spray pattern. The slits in the first and second facing layers were aligned in the same direction with one another. The laminate had a relaxed first length in the cross-direction (B—B) of 14 centimeters, a second fully stretched length of 22.5 centimeters and a third recovered length of 14.5 centimeters.

EXAMPLE 6

In Example 6, an elastic, fibrous nonwoven laminate was made using an 84 gram per square meter hydroentangled pulp fiber/spunbond fiber composite. The composite included a mixture of 14 grams per square meter of 3.0 denier polypropylene fibers and 70 grams per square meter of wood pulp fibers. Such a hydroentangled composite can be made in accordance with the teachings of U.S. Pat. No. 5,284,703 to Everhart et al. which is incorporated herein by reference in its entirety. The facing layer contained continuous slits such as are shown in FIG. 3. It was found that the pulp content in the composite made it easier to slit while the hydroentangling process improved the cloth-like appearance. The slit facing layer was adhesively attached to a 118 gram per square meter KRATON® G 2740 meltblown substrate layer which had elastic properties in both the A—A and B—B directions. The strips of facing layer were continuous in direction A—A and were from 3 to 5 millimeters in width in the direction of B—B. The resultant laminate stretched in direction B—B (See FIG. 4) and had a relaxed first length of 14.9 centimeters, a second fully stretched length of 27.0 centimeters and a third recovered length of 15.7 centimeters.

EXAMPLE 7

In Example 7, an elastic, fibrous nonwoven laminate was made using a 50 gram per square meter through-air bonded side-by-side polypropylene/polyethylene two denier bicomponent spunbond facing layer. The facing layer contained a plurality of slits that were generally 10 mm but ranged from 8–15 mm in length in a pattern similar to that shown in FIGS. 5 and 6. The spacing between any two adjacent slits in directions A—A and B—B ranged from 8–30 millimeters. To the slit facing layer there was attached a 60 gram per square meter KRATON® G 2755 elastic film using 80 grams per square meter of spray adhesive to perfect the attachment. The elastic film had elastic properties in both directions A—A and B—B. As a result, the laminate also had elastic properties in both directions. In the direction A—A, the sample had a first relaxed length of 8.0 centimeters, a second fully strength length of 14.0 meters and a third recovered length of 8.4 centimeters. In the direction B—B, the same sample had first, second and third lengths of 8.5 centimeters, 12.5 centimeters and 8.8 centimeters respectively.

EXAMPLE 8

In Example 8, an elastic, fibrous nonwoven laminate having two facing layers was made using two 205 gram per square meter (6 ounces per square yard) through-air bonded, side-by-side polyethylene/polypropylene two denier bicomponent spunbond facing layers. The facing layers contained a plurality of 10 to 15 millimeter long slits in an overlapping brick pattern. The spacing between two adjacent slits in direction A—A and B—B was 5 millimeters. In between the two slit facing layers there was attached a 34 gram per square meter meltblown elastomeric nonwoven web made from Arnitel® EM 400 copolyetherester polymer from DSM Engineering Plastics. Such elastomeric meltblown webs can be made in accordance with the teachings of U.S. Pat. No. 4,707,398 to Boggs and U.S. Pat. No. 4,741,941 to Morman et al, both of which are incorporated herein by reference in their entirety. The meltblown elastic nonwoven substrate layer had elastic properties in both the A—A and B—B directions. Each of the slit facing layers and the elastic substrate layer were bonded to one another using 10 grams per square meter of a spray adhesive. The laminate extended to 1.5 times its original length when stretched and returned to its original length when the stretching forces were relaxed.

EXAMPLE 9

In Example 9 the nonwoven facing layers were the same as those used in Example 8. The slit nonwoven facing layers were attached to an elastic laminate substrate layer which included the same 34 gram per square meter meltblown elastic substrate layer from Example 8 which had been previously laminated to a 137 gram per square meter (4.0 ounces per square yard) necked-in polypropylene spunbond nonwoven web. The laminated substrate layer was adhesively attached to each of the two slit nonwoven facing layers using 10 grams per square meter of spray adhesive. The unique feature of this embodiment was the stretch-to-stop feature of the laminate substrate layer. More specifically, the substrate layer could only be stretched a predetermined distance which was governed by the full expansion of the spunbond portion of the laminated substrate layer. Once this layer had been completely stretched, the laminate would stop stretching. As a result, the overall laminate could be specifically designed so as to prevent the slit nonwoven facing layers from overstretching which in turn could cause tears and/or delamination of the overall laminate. The overall laminate exhibited elastic properties.

EXAMPLE 10

In Example 10, a fibrous nonwoven laminate with stretched-to-stop functionality similar to that in Example 9 was made using the same bicomponent spunbond facing layer material of Example 9 sandwiched between and adhesively bonded to two layers of substrate layer material. The two pieces of substrate layer material were each made from a 34 gram per square meter meltblown elastic nonwoven web such as was previously described with respect to Examples 8 and 9. This elastic meltblown web was laminated to a tricot knit fabric style 850 from Mantex Fabric Corporation of New York City, N.Y. These two elastic meltblown/woven laminate substrate layers were adhesively attached to both sides of the slit bicomponent spunbond using 10 grams per square meter of spray adhesive on both sides of the bicomponent spunbond and with the elastic meltblown layers of the two laminates facing the slit bicomponent layer. As with Example 9, stretch-to-stop characteristics were imparted to the overall composite via to the woven components in the two substrate layers. The laminate when stretched exhibited elastic properties.

As can be seen in all the examples described above, an elastic, fibrous nonwoven laminate was formed which in all cases had elastic properties in the cross machine direction and, as shown in Examples 2 and 7, a laminate could also be created which had elastic properties in both the machine and cross directions. As a result, the present invention can be used to create elastic laminates which can be used in a wide variety of applications not the least of which includes personal care absorbent products such as diapers, training pants, incontinence garments, sanitary napkins, bandages and the like. Other uses include, for example, utilizing the laminate in the form of a medical drape.

Having thus described the invention in detail, it should be apparent that various modifications and changes can be made in the present invention without departing from the spirit and scope of the following claims.

We claim:

1. A Process for forming an elastic, fibrous nonwoven laminate comprising:

creating a first set of slits in a first nonwoven facing layer;

said first nonwoven facing layer including first and second longitudinal edges and first and second transverse edges;

said first set of slits including a first plurality of generally parallel rows of slits extending in a first direction from said first longitudinal edge to said second longitudinal edge;

each of said first rows of slits including a first plurality of individual discontinuous slits;

creating a second set of slits in said first nonwoven facing layer;

said second set of slits including a second plurality of generally parallel rows of slits extending in a second direction from said first transverse edge to said second transverse edge;

each of said second rows of slits including a second Plurality of individual discontinuous slits;

said first direction of said first slits being not generally parallel with said second direction of said second slits;

said first and second sets of slits each are formed into said first nonwoven facing layer in an overlapping brick pattern and attaching an elastic substrate layer to said first nonwoven facing layer while said elastic substrate layer is in a nonstretched condition and said first nonwoven facing layer is in a nonstretched condition to form a laminate having an exposed surface;

creating a first set of slits in a second nonwoven facing layer;

said second nonwoven facing layer including first and second longitudinal edges and first and second transverse edges;

said first set of slits in said second nonwoven facing layer including a first plurality of generally parallel rows of slits extending in a first direction from said first longitudinal edge to said second longitudinal edge;

each of said first rows of slits in said second nonwoven facing layer including a first plurality of individual discontinuous slits;

creating a second set of slits in said second nonwoven facing layer, said second set of slits in said second nonwoven facing layer including a second plurality of generally parallel rows of slits extending in a second direction from said first transverse edge to said second transverse edge;

each of said second rows of slits in said second nonwoven facing layer including a second plurality of individual discontinuous slits;

said first direction of said first slits in said second nonwoven facing layer being not generally parallel with said second direction of said second slits in said second nonwoven facing layer;

said first and second sets of slits each are formed into said second nonwoven facing layer in an overlapping brick pattern, and attaching said second nonwoven facing layer to a surface of said elastic substrate layer which is opposed to said first nonwoven facing layer while said elastic substrate layer is in a nonstretched condition and said second nonwoven facing layer is in a nonstretched condition to form a laminate having an exposed surface;

whereby said laminate has elastic properties in at least two directions across said exposed surface of said laminate.

2. The process of claim 1 which further includes the steps of:

creating at least a portion of said first set of slits in a direction which is generally perpendicular to a first intended direction of stretch of said laminate;

creating at least a portion of said second set of slits in a direction which is generally perpendicular to a second intended direction of stretch of said laminate.

3. The process of claim 2 wherein said first intended direction of stretch is generally perpendicular to said second intended direction of stretch.

4. The process of claim 1 wherein said elastic substrate layer comprises a liquid-permeable elastomeric nonwoven web.

5. The elastic process of claim 4 wherein said elastic substrate layer comprises a liquid-permeable elastomeric nonwoven web of meltblown fibers.

6. The process of claim 1 wherein said elastic substrate layer comprises a mixture of elastomeric and non-elastomeric fibers or particulates.

7. The process of claim 1 wherein said elastic substrate layer comprises a liquid-impermeable elastic film.

8. The process of claim 7 wherein said elastic substrate layer comprises a breathable elastic film.

9. The process of claim 1, wherein said elastic substrate layer is a liquid-permeable elastic film.

10. An elastic, fibrous nonwoven laminate comprising a nonwoven facing layer including first and second edges, said nonwoven facing layer defining a set of continuous slits therein, said set of slits including a plurality of generally parallel rows of slits extending in a first direction from said first edge to said second edge, said first direction of said slits being generally perpendicular to a first intended direction of stretch of said laminate, and an elastic substrate layer, said nonwoven facing layer being superposed on said elastic substrate layer, said nonwoven facing layer being attached to said elastic substrate layer, while said elastic substrate layer is stretched in a second direction generally parallel to a second intended direction of stretch, at a plurality of spaced apart locations to form said laminate having an exposed surface, said nonwoven facing layer being gathered between said spaced apart locations, said laminate having elastic properties both in said first and second intended directions of stretch across said exposed surface of said laminate.

11. An elastic, fibrous nonwoven laminate comprising a nonwoven facing layer including first and second edges, said nonwoven facing layer defining a set of slits therein, said set of slits including a plurality of generally parallel rows of slits extending in a first direction from said first edge to said second edge, each of said rows of slits including one or more individual slits wherein at least some of said slits are continuous and at least some of said slits are discontinuous, said first direction of said slits being generally perpendicular to a first intended direction of stretch of said laminate, and an elastic substrate layer, said nonwoven facing layer being superposed on said elastic substrate layer, said nonwoven facing layer being attached to said elastic substrate layer, while said elastic substrate layer is stretched in a second direction generally parallel to a second intended direction of stretch, at a plurality of spaced apart locations to form said laminate having an exposed surface, said nonwoven facing layer being gathered between said spaced apart locations, said laminate having elastic properties both in said first and second intended directions of stretch across said exposed surface of said laminate.

12. The elastic, fibrous nonwoven laminate of claim 11 wherein said elastic substrate layer comprises a liquid-permeable elastomeric nonwoven web.

13. The elastic, fibrous nonwoven laminate of claim 12 wherein said elastic substrate layer comprises a liquid-permeable elastomeric nonwoven web of meltblown fibers.

14. The elastic, fibrous nonwoven laminate of claim 11 wherein said elastic substrate layer comprises a mixture of elastomeric and non-elastomeric fibers or particulates.

15. The elastic, fibrous nonwoven laminate of claim 11 wherein said elastic substrate layer comprises a liquid-impermeable elastic film.

16. The elastic, fibrous nonwoven laminate of claim 15 wherein said elastic substrate layer comprises a breathable elastic film.

17. The elastic, fibrous nonwoven laminate of claim 11, wherein said elastic substrate layer is a liquid-permeable elastic film.

18. The elastic, fibrous nonwoven laminate of claim 11 wherein said laminate forms at least a portion of a personal care absorbent product.

19. The elastic, fibrous nonwoven laminate of claim 11 wherein said laminate is in the form of a medical drape.

20. The elastic, fibrous nonwoven laminate of claim 11 wherein said laminate forms at least a portion of an article of clothing.

* * * * *

UNITED STATES PATENT AND TRADEMARK OFFICE
CERTIFICATE OF CORRECTION

PATENT NO. : 5,804,021
DATED : September 8, 1998
INVENTOR(S) : Abuto et al.

It is certified that error appears in the above-identified patent and that said Letters Patent is hereby corrected as shown below:

Column 4, Line 57, after the word "the", please insert -- radial block copolymers may be designated $(A-B)_m -X$, wherein X --

Column 15, Line 1, "(2.07 x 105" should read -- $(2.07 \times 10^5$ --

Signed and Sealed this

Second Day of February, 1999

Attest:

Attesting Officer

*Acting Commissioner of Patents and Trademarks*